United States Patent [19]
Payne et al.

[11] 3,836,391
[45] Sept. 17, 1974

[54] PROCESS FOR IMPROVING THE ANTISLIP PROPERTIES OF A CELLULOSIC SURFACE

[75] Inventors: Charles C. Payne, Chicago; Peter H. Vossos, Lisle, both of Ill.

[73] Assignee: Nalco Chemical Company, Chicago, Ill.

[22] Filed: Aug. 25, 1972

[21] Appl. No.: 283,837

Related U.S. Application Data

[62] Division of Ser. No. 111,627, Feb. 1, 1971, Pat. No. 3,711,416.

[52] U.S. Cl............................ 117/152, 117/169 A
[51] Int. Cl............................................. D21h 1/10
[58] Field of Search..... 117/152, 169 A; 252/313 S; 106/36; 260/29.6 HN

[56] References Cited
UNITED STATES PATENTS

| | | | |
|---|---|---|---|
| 2,643,048 | 6/1953 | Wilson | 117/152 X |
| 2,833,661 | 5/1958 | Iler | 117/154 X |
| 3,377,293 | 4/1968 | Shepherd | 252/313 X |
| 3,649,348 | 3/1972 | Vossos | 117/152 |
| 3,689,431 | 9/1972 | Pagne | 252/313 S |

Primary Examiner—William D. Martin
Assistant Examiner—M. R. Lusignan
Attorney, Agent, or Firm—Johnston, Keil, Thompson & Shurtleff

[57] ABSTRACT

The antislip properties of a cellulosic surface are improved by applying thereto a coating of a composition containing an aqueous colloidal anionic silica sol and a non-gelling flocculating agent.

4 Claims, No Drawings

PROCESS FOR IMPROVING THE ANTISLIP PROPERTIES OF A CELLULOSIC SURFACE

This application is a division of U.S. application Ser. No. 111,627 filed Feb. 1, 1971, now U.S. Pat. No. 3,711,416, patented Jan. 16, 1973.

BACKGROUND

Various articles such as bags, cartons and other containers fabricated from kraft paper, cardboard and other types of cellulose materials as used for the packing of foodstuffs, chemicals and the like possess the inherent disadvantage of slipping and sliding against each other. This tendency to slip and/or slide may be undesirable and in many cases harmful. Attempts have been made to overcome this difficulty. For example, containers fabricated from crepe paper or containers treated with a form of an adhesive have been employed. Such containers have not been entirely satisfactory either for reasons of economy, poor printing characteristics, insufficient slip resistance, unpleasant or uncomfortable handling characteristics, or for a combination of such reasons.

Prior art disclosures have shown that it is possible to coat cellulosic materials with colloidal silica sols. These coatings tend to impart definite antiskidding properties to the coated cellulosic materials. The colloidal silica sols are conveniently handled and readily applied to the cellulosic materials. Also from an economic standpoint they are very advantageous. The use of colloidal silica sols to coat paper in order to provide slip resistance is disclosed in U.S. Pat. Nos. 2,643,048 and 2,872,094. Colloidal silica sols have also been employed to impart stiffness to paper and generally for the treatment of paper as disclosed in U.S. Pat. Nos. 2,833,661, 2,801,938, 2,980,558 and other patents.

The use of colloidal silica sols as a paper coating to provide slip resistance is sometimes referred to as frictionizing the paper or as imparting antiskid or antislip properties thereto. Despite this well known use of colloidal silica sols as surface coatings to impart antislip properties, it would be desirable to provide antislip compositions having enhanced antislip characteristics.

OBJECTS

Accordingly, it is one object of this invention to provide new and improved silica sol compositions which are particularly useful when applied as coatings to cellulosic sheet materials.

Another object of the invention is to provide new and useful silica sol compositions which can be prepared and stored in a concentrated liquid form and diluted for use as coating compositions.

A further object of the invention is to provide a new and improved method for preparing compositions of the type described.

Another object is to provide an improved antislip cellulosic material.

Still a further object is to provide improved antislip cellulosic materials without detrimentally affecting their printing and/or handling characteristics.

BRIEF SUMMARY OF THE INVENTION

In accordance with the invention it has been found that new and useful compositions can be prepared by mixing an aqueous colloidal anionic silica sol with a non-gelling flocculating agent in sufficient amount to thicken said sol without gelling it, the silica particles in said colloidal silica sol having an average diameter within the range of 4 to 120 millimicrons and the relative proportions of said colloidal silica sol and said flocculating agent being sufficient to produce enhanced antislip effect when such compositions are applied as coatings to cellulosic surfaces at the rate of 0.05 to 0.5 pound, expressed as $SiO_2$, per 1000 ft.$^2$ of said surface and allowed to dry. Coated cellulosic sheet materials to which said compositions have been applied and thereafter dried have improved antislip characteristics as compared with coatings containing the colloidal silica sol per se or an aqueous dispersion of the flocculating agent per se and the antislip improvement is more than merely additive.

DETAILED DESCRIPTION OF THE INVENTION

The preparation of colloidal silica sols is well known in the art and is described, for example, in U.S. Pat. Nos. 3,440,174, 3,462,374, 3,468,813, 3,538,015 and other patents cited therein. In general, silica sols are either cationic sols or anionic sols. In the cationic sols the particles are positively charged and in the anionic sols the particles are negatively charged. For the purpose of this invention any of the colloidal anionic silica sols can be used.

Inasmuch as the invention contemplates the preparation of liquid compositions having a relatively high concentration of solids in the form of $SiO_2$, which compositions are capable of being diluted with water before application as coatings, it is desirable to employ as a starting material an aqueous colloidal silica sol containing at least 30 percent by weight colloidal silica and usually 40 percent to 50 percent by weight colloidal silica. A non-gelling flocculating agent is then added to the aqueous colloidal silica sol and the entire composition intimately mixed under conditions sufficient to produce a homogeneous mixture in which the solid particles will remain in suspension.

The conditions used in mixing the colloidal silica sol and the flocculating agent will depend upon the particular flocculating agent. In some cases, a stable homogeneous mixture can be obtained by agitation at atmospheric pressure. In other cases, superatmospheric pressures may be required in which shearing forces of 500 pounds per square inch or more may be necessary. In some cases, it may be desirable to use pressures of 2,000 to 3,000 pounds per square inch in order to homogenize the colloidal silica sol and the flocculating agent.

As previously indicated, the silica particles in the colloidal silica sol will usually have an average diameter within the range of 4 to 120 millimicrons (mu), preferably within the range of 15 to 50 mu.

The viscosity of the homogeneous concentrate will usually be within the range of 50 to 2000 centipoises at 25°C., depending upon the silica concentration and the flocculating agent, as well as the relative proportions. When the concentrated composition is diluted with water for application as a coating, the viscosity will normally be below 5 centipoises at 25°C. The pH of the compositions is usually within the range of 9.0 to 10.5.

Usually, the concentrated composition is diluted with water until the silica content is around 0.5 percent to 1 percent by weight but other dilutions to concentrations within the range of 0.5 percent to 3 percent by weight SiO₂ can be used depending upon the desired thickness of the coating.

The ratio of colloidal silica in the colloidal silica sol to flocculating agent in a composition containing at least 30 percent by weight $SiO_2$ as colloidal silica sol particles should be such as to produce a synergistic effect when the concentrated composition is subsequently diluted and applied to a cellulosic sheet material as a coating. The optimum amounts of flocculating agent have to be determined by routine experiments for different flocculating agents but usually the amounts of flocculating agent will be within the range of 0.01 percent to 1.5 percent by weight of the silica in the silica sol. Thus, with a sol containing 50 percent silica, 0.01 percent by weight of the sol (0.02 percent of the $SiO_2$) of one flocculating agent might be required to give the synergistic antislip effect. With another flocculating agent, 0.5 percent ± 0.2 percent of the weight of the sol (1 percent ± 0.4 percent of the $SiO_2$) might be required. The amounts used should not increase the viscosity beyond 2000 centipoises at 25°C.

The colloidal silica sol can also contain minor amounts of organic liquids commonly used to prevent freezing which do not affect the stability of the sol, for example, it is permissible to use colloidal silica sols containing 5 percent to 10 percent ethylene glycol.

In practicing the invention, various types of flocculating agents, either organic or inorganic can be used but organic types are preferred. The flocculating agent should be soluble in water at least to the extent of 0.5 percent by weight at 25°C.; otherwise it will not be effective as a flocculating agent. It must be capable of increasing the viscosity of the aqueous colloidal silica sol without gelling it. Waters containing calcium and magnesium ions as hardness components (e.g., as calcium bicarbonate) can be employed as flocculating agents. The flocculating agent should be free from strong acid groups which might gel the sol.

The nature of the floc can vary from a loose, "soft" one to a dense, "hard" type.

One preferred type of flocculating agent is a synthetic polymer in a water dispersible state having a linear hydrocarbon structure containing in a side chain a quaternary imidazole group having the following structure

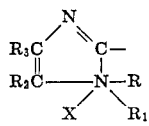

where R and $R_1$ are $C_1$ to $C_{18}$ hydrocarbon, hydroxyhydrocarbon, amino hydrocarbon, or hydrocarbon containing both hydroxy and amino groups, X is a negative radical of an organic (e.g., acetic, propionic, etc.) or inorganic (e.g., Cl, $SO_4$, etc.) acid, and $R_2$ and $R_3$ are hydrogen or $C_1$ to $C_4$ alkyl radicals. In particular, the quaternary polyvinyl-imidazoles are useful and are usually employed at a ratio of about .002 part per part by weight of $SiO_2$ for a sol having an average particle diameter of about 20 millimicrons. Silica sols with different average particle sizes will require a different ratio of flocculating agent to silica. These quaternary compounds are cationic.

Another useful type of flocculating agent is a diester or mixture of diesters of polyethylene glycol 200, 400 and/or 600 and fatty acids containing 14 to 18 carbon atoms, particularly the dioleate esters. Instead of oleyl, the ester group can contain a $C_{14}$, $C_{15}$, $C_{16}$, $C_{17}$ and/or a $C_{18}$ group other than oleyl. The hydrocarbyl groups of the ester can be saturated or unsaturated.

The quantity of the coating composition applied to a cellulosic sheet material for the purpose of the invention is subject to variation but is preferably at least 0.05 pound and usually within the range of 0.05 pound to 0.5 pound per 1000 ft.² of surface of such material, expressed as $SiO_2$.

The application of the coating is not limited to any special type of cellulosic material but the invention is especially useful for coating cellulosic sheet material employed in making paper bags, cartons, wrapping paper and the like. These sheet materials are made in various weights but the particular weight is not material from the standpoint of the invention. Nor is the chemical treatment of the cellulose used in making paper or similar sheet material critical. Thus, the cellulosic sheet material may be made from unbleached soft wood kraft pulp, sulfite and ground wood pulp blends, ground wood and bleached kraft blends, or the like. It will be recognized that antislip coatings on cartons and bags are particularly important where the cartons and bags are stacked on one another and the coating prevents slipping.

To evaluate the invention, the diluted composition of the type previously described was applied to kraft brown wrapping paper having a weight of 16.4 pounds per 1000 ft.². The coating was applied with a trailing blade coater which is a tool for applying a very uniform layer of coating. The test sheets were 9 inches by 12 inches.

The coater comprised a flexible trailing blade fitted with a rubber covered backup cylinder and hand crank. The coating was applied to the leading edge of the test sheet with an eyedropper and then spread evenly over the sheet by the coating blade as the back-up cylinder and the test sheet were rotated past the blade.

After the paper was coated the treated paper and a water treated blank were equilibrated at ambient temperatures and humidity for at least 24 hours.

The finally dried coated papers and blank papers were then subjected to testing on a slide angle tester. Each sheet was tested for the critical angle data, i.e., the angle at which the test block slides down the plane on a St. Regis slide angle tester, Model CS-152 using the suggested TAPPI method T503su-67.

The St. Regis slide angle tester may be generally described as comprising a sled and an incline plane.

The sled is a metal block preferably rectangular with a flat plane lower surface, 8.9±1.3 centimeters (3.5±0.5 inches) wide and 10.2±2.5 centimeters (4.0±1.0 inches) long and of such weight as to provide a measure of 14±3 grams per centimeters squared (0.2±0.04 psi) when horizontal.

The sled must also include a means for clamping the leading edge of the test specimen to the front or to the top surface of the sled.

The inclined plane is a plain surface hinged so it can be tilted with a smooth incompressible top surface of nonmagnetic material having a width of at least 1 inch wider than the sled and a length sufficient to permit the sled to move at least ½ inch and provided with a clamp from the test specimen at the upper end of the plane (and with a bumper stop at the lower end). Also, the incline plane should include a means to indicate the angle of displacement of the plane within 0.5° and some means for smoothly increasing the inclination of the plane from horizontal to an arc of at least 45° at a rate of 1.5°±0.5° per second.

Test sheets of paper are cut and affixed to the sled. They are cut so that they are a little larger than the contacting area so that the sheet will extend slightly beyond the bottom edge of the sled.

The outer sheet is cut to be affixed to the surface of the plane. It is cut large enough to cover at least the working surface of the plane.

The plane is leveled so that it is horizontal when the inclinometer indicates zero.

One sheet is mounted on the plane with the machine direction parallel to the direction of the slide and with the surface to be tested facing upwards. The other sheets are attached to the sled. The sled is then positioned on the top of the lower sheet with its crosswise direction parallel to the direction of the slide and with the surface to be tested facing downward. Likewise, surfaces of the specimen are now in contact with their machine directions at right angles.

There is allowed a dwell time of 30±5 seconds, then the plane is inclined at the specified rate of 1.5°±0.5° per second. The inclinator is stopped when the sled starts to move. The sled is permitted to slide until it stops. The slide angle $\theta$ is recorded to the nearest 0.1°. At this point the sled is lifted along with the attached specimen and the entire assembly is placed at the original starting position with the plane in its horizontal position.

In order to determine the retention of antiskid properties when subjected to continual sliding the tested paper was subjected to 10 successive slides. After the 10 successive slides the paper was once again tested for its critical or slide angle $\theta$.

The best mode contemplated for the practice of the invention is illustrated by the following examples in which the quantities are stated in parts by weight unless otherwise indicated.

EXAMPLE I

A composition was prepared from an aqueous anionic colloidal silica sol (NALCO 1050) consisting essentially of 50 percent $SiO_2$ particles having an average diameter of about 20 millimicrons, 40 percent water and 10 percent ethylene glycol, diluted to 3 percent $SiO_2$ with deionized water and mixed with 0.1 percent by weight of the sol of polyvinylimidazole (Lufixan). The mixing was carried out at ambient temperatures and a homogeneous product was obtained in which the silica particles remained in suspension. The viscosity of the composition was approximately 5 centipoises at 25°C.

This composition was then coated on St. Regis "Turf Builder" paper and evaluated on a slide angle tester in the manner previously described. A test was also run with a blank coated with deionized water in the manner previously described and with a solution of the silica sol per se (Nalco 1050). The results obtained were as follows:

| Sample | Average Angle° |
|---|---|
| Blank | 12.0 |
| 3% 1050 | 23.8 |
| 3% 1050 + 0.1% PVI | 25.3 |
| Difference between 1050 alone and mixture = 1.5 | |

The foregoing results show that the silica sol alone increased the antislip resistance of the coating but the combination of the silica sol and the flocculating agent further increased the antislip resistance.

EXAMPLE II

The procedure was the same as in Example I except that the colloidal silica sol (Nalco 1050) was diluted to a 0.5 percent $SiO_2$ concentration and applied as a coating to kraft brown wrapping paper. A mixture of 0.5 percent Nalco 1050 and 0.01 percent polyethylene glycol 400 dioleate was prepared and also applied as a coating to a piece of said paper. Upon evaluation in the manner previously described the following results were obtained.

| Sample | Angle of Friction° |
|---|---|
| Blank paper + deionized water | 32.8 |
| 0.5% 1050 | 38.3 |
| 0.5% 1050 + 0.01% polyethylene glycol 400 dioleate | 39.8 |
| Difference between 1050 and mixture | 1.5° |

In this case there was also an increase in antislip resistance attributable to the mixture as compared to the silica sol alone.

EXAMPLE III

The procedure was the same as in Example II except that an additional test was made with a paper coated with a 0.01 percent aqueous solution of polyethylene glycol 400 dioleate alone.

The following results were obtained.

| Sample | Angle of Friction° |
|---|---|
| Blank Paper + DI $H_2O$ | 35.3 |
| 0.5% 1050 | 37.6 |
| Difference between 1050 and blank | 2.3 |
| 0.01% PEG-400, dioleate | 36.5 |
| Difference between PEG-400, dioleate and blank | 1.2 |
| 0.5% 1050 + 0.01% PEG-400, dioleate | 39.7 |
| Difference between 1050 + PEG-400, dioleate and blank | 4.4 |
| Sum of 1050 (alone) + PEG-400, dioleate (alone) results | 3.5 |
| Difference due to synergistic effect | 0.9 |

It will be seen that the antislip effect obtained with the mixture is substantially greater than that obtained from a coating of either the silica sol alone or the flocculating agent alone and the increase is more than merely additive. Hence, the synergistic effect is clearly demonstrated.

It will be understood that the conditions used in mixing the colloidal silica sol and the flocculating agent are subject to variation. In some cases, superatmospheric pressures are used to produce a homogenized product.

The concentrated compositions will normally contain at least 30 percent by weight $SiO_2$ and usually amounts of $SiO_2$ within the range of 30 percent to 60 percent. These concentrated compositions can be stored and shipped in their concentrated form and later diluted by the user for application to cellulosic materials.

The term "cellulosic material" as used herein is intended to include and cover a material made primarily from cellulose. The principal use of the compositions is to provide antislip resistance to felted cellulose fibers such as paper. However, they can also be applied to textiles and other felted or woven materials and in other applications where antislip resistance is desired.

The invention is hereby claimed as follows:

1. A cellulosic material having a surface coated with a dried coating of a composition consisting essentially of a homogeneous mixture of an aqueous colloidal anionic silica sol and a non-gelling synthetic polymer flocculating agent in sufficient amount to thicken said sol without gelling it, the silica particles in said colloidal silica sol having an average diameter within the range of 4 to 120 millimicrons, said sol containing 0.5 to 3 percent by weight $SiO_2$, said flocculating agent being soluble in water at least to the extent of 0.5 percent by weight at 25°C., the amount of said flocculating agent being within the range of 0.01 percent to 1.5 percent by weight of the silica in said silica sol, the amount of said coating when applied to said surface and dried being at least 0.05 pound per 1000 ft.$^2$ of said surface, and the relative proportions of said silica sol and said flocculating agent being sufficient to produce a synergistic anti-slip effect.

2. A cellulosic material as claimed in claim 1 in which said flocculating agent is a synthetic polymer having a linear hydrocarbon structure containing in a side chain a quaternary imidazole group.

3. A cellulosic material as claimed in claim 1 in which said flocculating agent is a di-fatty ester of a normally liquid polyethylene glycol or mixture of polyethylene glycols, said glycols having a molecular weight from 200 to 600 and said fatty ester groups each containing 14 to 18 carbon atoms.

4. A cellulosic material as claimed in claim 1 in which said surface is coated with a dried coating of said composition applied at the rate of 0.05 pound to 0.5 pound per 1000 ft.$^2$ of said surface, expressed as $SiO_2$.

* * * * *